(12) United States Patent
Lyback

(10) Patent No.: US 7,370,010 B2
(45) Date of Patent: May 6, 2008

(54) AUTOMATED SEMI-DETERMINISTIC TRADING SYSTEM

(75) Inventor: David Lybäck, Stockholm (SE)

(73) Assignee: OMX Technology AB, Stockholm (SE)

( * ) Notice: Subject to any disclaimer, the term of this patent is extended or adjusted under 35 U.S.C. 154(b) by 1190 days.

(21) Appl. No.: 10/095,773

(22) Filed: Mar. 13, 2002

(65) Prior Publication Data

US 2002/0156721 A1 Oct. 24, 2002

(51) Int. Cl.
*G06Q 30/00* (2006.01)
(52) U.S. Cl. .............................. 705/37; 705/35; 705/36
(58) Field of Classification Search .................. 705/35, 705/36, 37
See application file for complete search history.

(56) References Cited

U.S. PATENT DOCUMENTS

| | | | |
|---|---|---|---|
| 6,408,282 B1* | 6/2002 | Buist | 705/36 R |
| 6,421,653 B1* | 7/2002 | May | 705/36 R |
| 6,618,707 B1* | 9/2003 | Gary | 705/36 R |
| 7,110,969 B1* | 9/2006 | Bennett et al. | 705/35 |
| 7,212,999 B2* | 5/2007 | Friesen et al. | 705/37 |
| 2002/0038279 A1* | 3/2002 | Samuelson et al. | 705/37 |
| 2002/0052822 A1* | 5/2002 | Terashima | 705/37 |
| 2002/0077962 A1* | 6/2002 | Donato et al. | 705/37 |
| 2002/0128952 A1* | 9/2002 | Melkomian et al. | 705/37 |
| 2003/0004859 A1* | 1/2003 | Shaw et al. | 705/37 |

FOREIGN PATENT DOCUMENTS

| | | |
|---|---|---|
| GB | 2 258 061 | 1/1993 |
| WO | WO 99/27477 | 6/1999 |
| WO | WO 01/37509 | 5/2001 |

OTHER PUBLICATIONS

"Trading department support systems", Wall Street & Technology, v10, n5, p. 53(11), Jan. 1993.*

(Continued)

*Primary Examiner*—Nga Nguyen
(74) *Attorney, Agent, or Firm*—Nixon & Vanderhye P.C.

(57) ABSTRACT

In an automated exchange system, the deterministic matching is supplemented with a non-deterministic trade agent service. The agent server is preferably run in accordance with a best-effort principle, thereby making it possible to design at low cost. The agent trade server is designed to provide users with functionality deemed not to be necessary to implement in the deterministic core of the matching system or deemed to be to expensive to implement therein. The agent trade server then feeds the deterministic core of the matching system with trade input data resulting from the input received for the users of the automated trading system. Thus, the designer of a complex trading system is given an option to provide centrally located functionality to the users of the system without having to change the deterministic core of the matching system. Since the agent trade server is working closely to the deterministic core of the trading system, it is preferred to co-locate the agent trade server with the core of the matching system.

13 Claims, 3 Drawing Sheets

OTHER PUBLICATIONS

"Automated Trading: Jefferies & Co.'s ITG to Add Institutional Indications to Quantex Routing System", Investment Management Technology, v1, n8, p N/A, Jan. 10, 1992.*

"Townsend provides OS/2, Windows Route to OTOB", Dealing With Technology, v3, n22, p N/A, Nov. 8, 1991.*

"Tratus: B-Trade Services automates new securities settlement busness on stratus computers", Business Wire, Jun. 24, 1997.*

M. Boman: "Trading Agent," Agent Link News 6: 15-17, 2001.

M. Boman, et al.: "Artificial Agent Action in Markets," Electronic Commerce Research 1(1-2): 159-168, 2001.

M. Boman, et al.: "Parrondo Strategies for Artificial Traders." In Intelligent Agent Technology, N. Zhong, J. Liu, S. Ohsuga, J. Bradshaw (eds.), pp. 150-159, World Scientific, 2001.

M. Bylund, 2001. Personal service environments Openness and user control in user-service interaction. Tech. Rep., Dept of Information Technology, Uppsala Univ. IT Licentiate Thesis 2001-008.

R. Cover, 2001. The XML cover pages—Open Financial Exchange (OFX). Available at http://xml.coverpages.org/ofx.html, last modified Jan. 3, 2001.

V. Hauser et al, 2002. Network monitoring for networking agents. M.S. thesis, Dept of Computer and Systems Sciences, Stockholm University. 02-01-DSV-SU.

K.K. Ramakrishnan, 2001. The Addition of Explicit Congestion Notification (ECN) to IP. Internet Engineering Task Force. RFC 3168, Proposed Standard.

M. Ruddle: "The Application of Mobile Agents to Share-trading." M. Sc. Telecommunications thesis. department of Electrical and Electronic Engineering, University of London.

A. S. Tanenbaum, 1996. Computer Networks, 34d ed. Prentice-Hall, New Jersey.

C. Weinhardt et al.: "Agent-Mediated Off-Exchange Trading." Proc. HICSS-32nd Annual Hawaii International Conference on System Sciences. IEEE Computer Society. 1998.

Search Report for Singapore Application No. 200602973-0 dated Mar. 3, 2007.

Written Opinion for Singapore Application No. 200602973-0 dated Mar. 3, 2007.

\* cited by examiner

AUTOMATED SEMI-DETERMINISTIC TRADING SYSTEM

TECHNICAL FIELD

The present invention relates to an automated exchange system, and in particular to an automated exchange designed to provide a flexible structure able to cope with many different types of requirements.

BACKGROUND OF THE INVENTION AND PRIOR ART

The conventional automated trading systems of today implemented at the automated exchanges and market places around the world are all high-confidence systems. The systems behave in a way and follow rules that are very well understood and which output a result that is easy to predict given a particular sequence of input data. In fact, most automated systems operated by the major exchanges trading financial instruments (stocks, bonds, currencies, derivatives thereof, etc.) and commodity contracts including commodity derivatives use a system that is completely deterministic. In such a deterministic system, the output depends only on the input data sequence(s) received by the system. The input data is processed by the automated, computerized, matching system, and the output data is a well-documented matching result, which only depends on the series of input data. This architecture is a key requirement for most major investors using a trading system for matching orders. The reason for this requirement is that they cannot take the risk to have their orders treated any other way.

A problem with such a deterministic, automated matching system is that it must be designed to perform at a specified lowest level of performance under the worst circumstances and operating conditions envisaged by the system designer. The system must be able to cope with a number of different events, such as power failure, a highly variable load of input commands, and faulty input commands, without departing from the predictable output. Designing a system that meets all such requirements is very expensive. A party operating such an expensive exchange will hence have to charge a considerable amount for each transaction carried out by the system in order to cover the expenses for developing and operating the automated exchange system.

Furthermore, a trend in designing future automated exchange systems is towards providing more and more functionality in the centrally-located matching system of the exchange system. This approach provides clients connected to the system access to a broad variety of services without having to provide each client/user with complex software/hardware designed to carry out these services. However, this in turn results in an even more complex central system, which is required to operate with high confidence. The cost for developing such a high-confidence system providing all services requested by its users will be very high. The cost for carrying out transactions in such a system will therefore reach a level where some users find the cost too high. As a result, those users will perform the transaction elsewhere or refrain from doing the transaction.

In addition, contingency order matching can easily degrade the performance of the matching service. Sometimes, for load reasons these services must be suspended. This is a crude maneuver, and will not suffice as users expect all their orders kept active and ready to trade at various market conditions. Future order types with more conditions and parameters will also increase the expectations on the evaluation policy. In effect, users will slowly start to expect a more refined view on Quality-of-Service as is true in other areas of Information Technology. The non-deterministic nature of multi-threaded processes with "anytime" algorithms has so far effectively kept them banned from live exchanges.

Hence, it is desired to have best-effort processing services in certain cases, to open up for evaluation of more complex orders, but best effort services are ruled out by the deterministic requirement for the matching engine software. There is a need for a computerized automated exchange system that is able to centrally provide a very broad range of services to its users (clients) and which system at the same time can be developed and designed in a manner that keeps costs at an acceptable level, and which also can provide an acceptable matching of complex contingency orders without negatively affecting the matching engine of the exchange system.

SUMMARY

It is an object of the present invention to provide a matching system operating in accordance with the deterministic matching principles required by the participants of an automated trading system. The system further being designed to centrally provide a very broad range of services to its users (clients) and which system at the same time can be developed and designed in a manner that keeps costs at an acceptable level.

This object and others are obtained by the present invention as set out in the appended claims. In an automated exchange system, the deterministic matching core unit of the exchange system is supplemented with an agent trade server designed to provide a range of additional services. The agent trade server is preferably run in accordance with a best-effort principle, thereby making it possible to design at low cost. The agent trade server is further designed to provide users with functionality that is not necessary or too expensive to implement in the deterministic core of the matching system. When the agent trade server is run in accordance with a best-effort principle a deterministic output cannot be guaranteed. The agent trade server feeds the deterministic core of the matching system with order input data resulting from the input received from the users of the automated trading system. Thus, the designer of a complex trading system is given an option to provide centrally-located functionality to the users of the system without having to change the deterministic core architecture of the matching system. Since the agent trade server is working in close connection with the deterministic core of the trading system, it is preferred to physically co-locate the agent trade server computer(s) with the computer(s) hosting the core of the deterministic matching system.

BRIEF DESCRIPTION OF THE DRAWINGS

The present invention will now be described in more detail byway of non-limiting examples and with reference to the accompanying drawings, in which.

DESCRIPTION OF PREFERRED EMBODIMENTS

Figure 1:
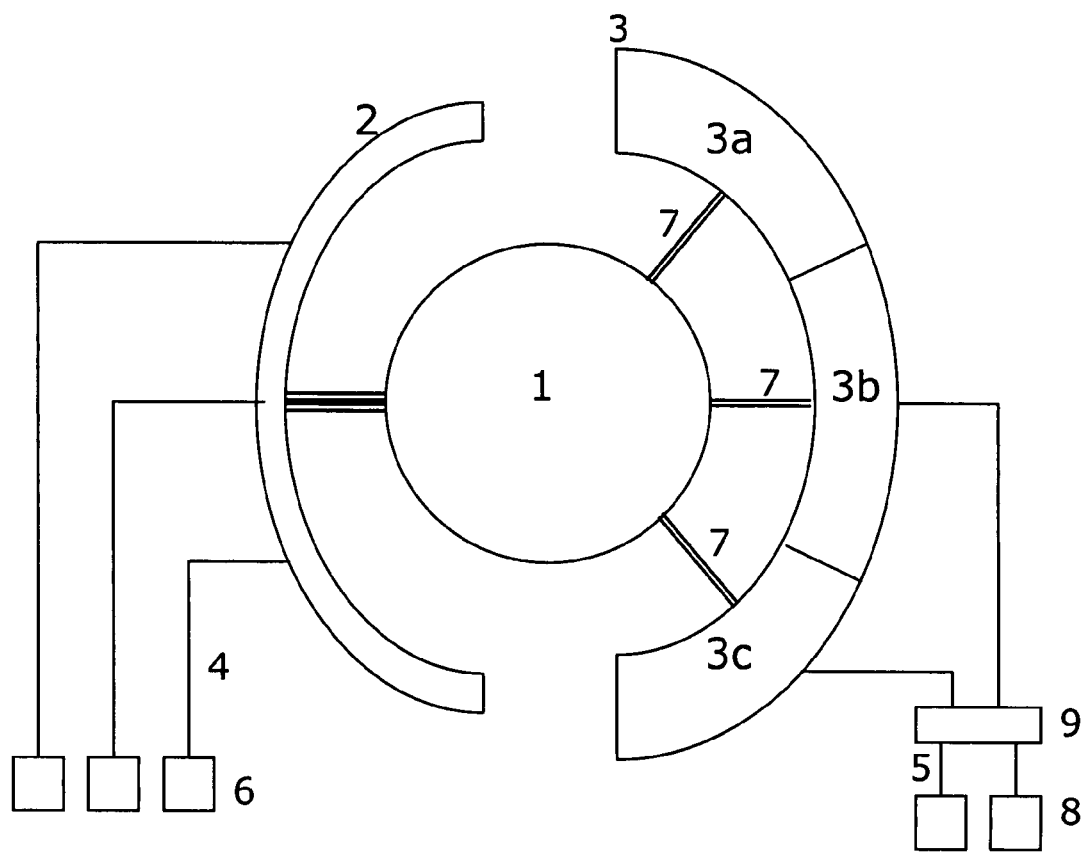
FIG. 1 is a general view of an automated exchange system including a deterministic matching core unit and a non-deterministic agent trade server.

In FIG. 1, a general view of an automated exchange system is shown. The system comprises a matching core unit 1 designed in accordance with an architecture that gives the system a completely deterministic behavior. The core unit can for example be a computer executing the SAXESS® Software developed and sold by OM Technology AB, Sweden. The system also comprises a multi-protocol gateway 2 forming an interface between the core unit 1 and a number of input terminals 6. The terminals 6 are connected to the gateway 2 via lines 4. The lines 4 are typically leased lines, but also other types of lines including an Internet connection can be used as long as the gateway is designed to handle the protocol of the used connection. The lines 4 can also be used to provide users of the system with multicast messages, e.g. price updates. The connection from an input terminal via a leased line connecting to the core of the automated trading system via a gateway is an example of how a conventional trading system can be designed.

In addition to conventional system units, the system as depicted in FIG. 1 is provided with a unit 3 operating in close relation with the core unit 1, and is connected thereto via high capacity communication lines 7. The unit provides additional system services and uses an architecture that does not ensure deterministic matching. The unit 3 continuously receives information relating to the matching taking place in the core unit. In FIG. 1 the unit 3 is sub-divided into different sub-units. Each sub-unit is designed to provide a particular type of additional service.

Thus, the sub-unit 3a is a computer running software specialized in finding solutions to complex combination orders. The sub-unit 3b is termed an agent trade server of a first type. The unit can, for example, be designed with user-configurable agents (specialized software acting on behalf of a user) controlled by a master dispatcher that utilize multi-threading or similar non-guaranteed resource sharing under the operating system of the server. The users are able to (and should) reconfigure their agents, i.e. set various parameters therein, but they cannot reprogram them. The sub-unit 3c is an agent trade server of a second type, with user-programmable agents for example executing under resource management or similar sharing mechanism. Further, the sub-unit 3c is preferably provided with an extensive shielding mechanism in-between individual agents, so that one individual faulty programmed or resource-demanding agent cannot affect the others in an uncontrolled way.

The unit 3 is connected to input terminals 8, which may be, but do not have to be, the same as the input terminals 6 via external communication lines 5, to a communication interface 9, typically via Internet links for the interactive sessions and the subscriptions of various kinds (status updates etc.).

Note that among the sub-unit servers 3a, 3b and 3c the server 3a is not connected to the interface 9 and hence does not have any direct external connections, only internal links to/from the deterministic core unit 1. This is in accordance with one preferred embodiment. In other preferred embodiments the unit 3a may equally well be connected also to the interface 9.

Figure 2:
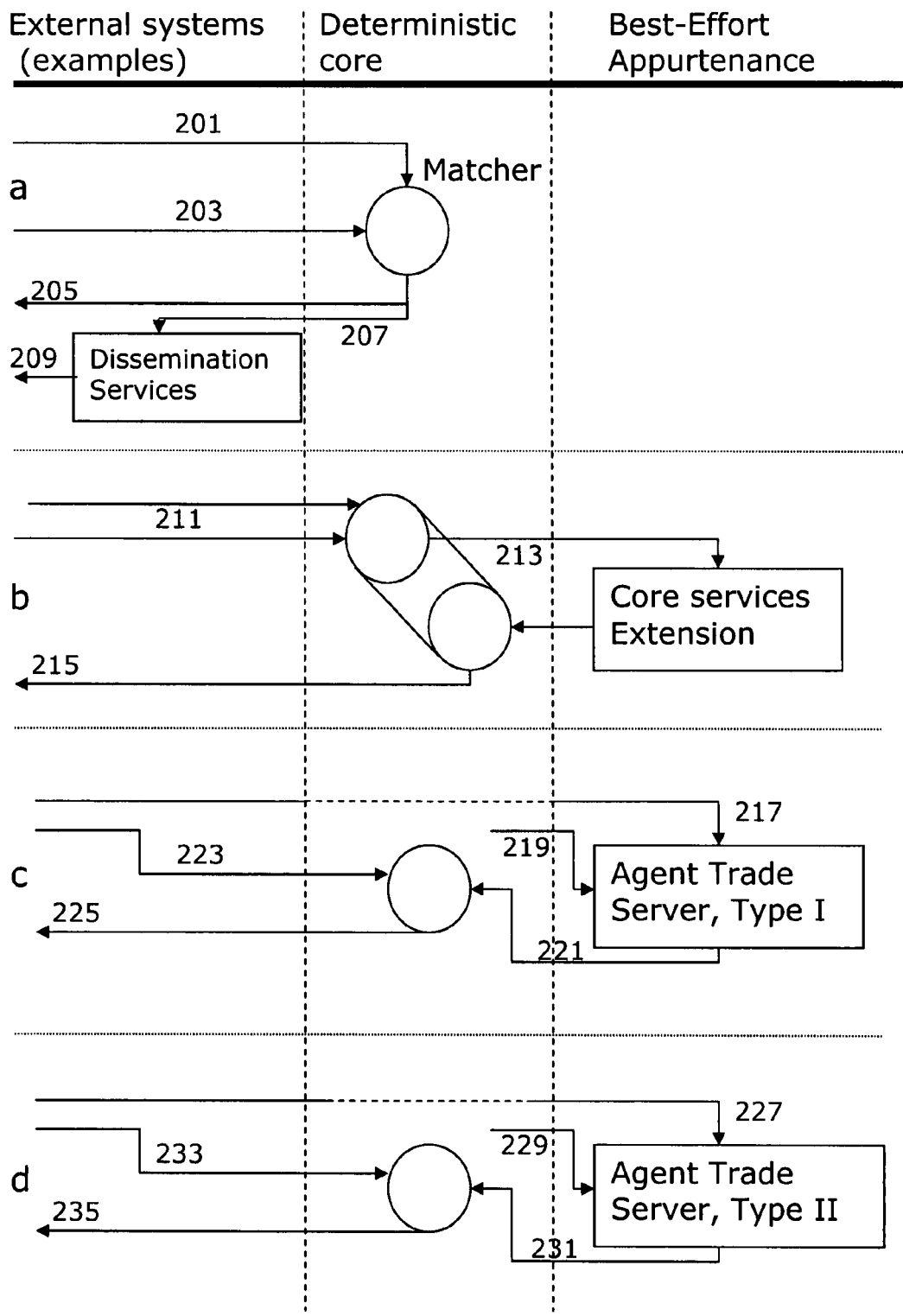
FIGS. 2a-2e illustrate different information flows within the automated exchange system of FIG. 1 when user transmits data having various contents to the exchange system.
Figure 2:
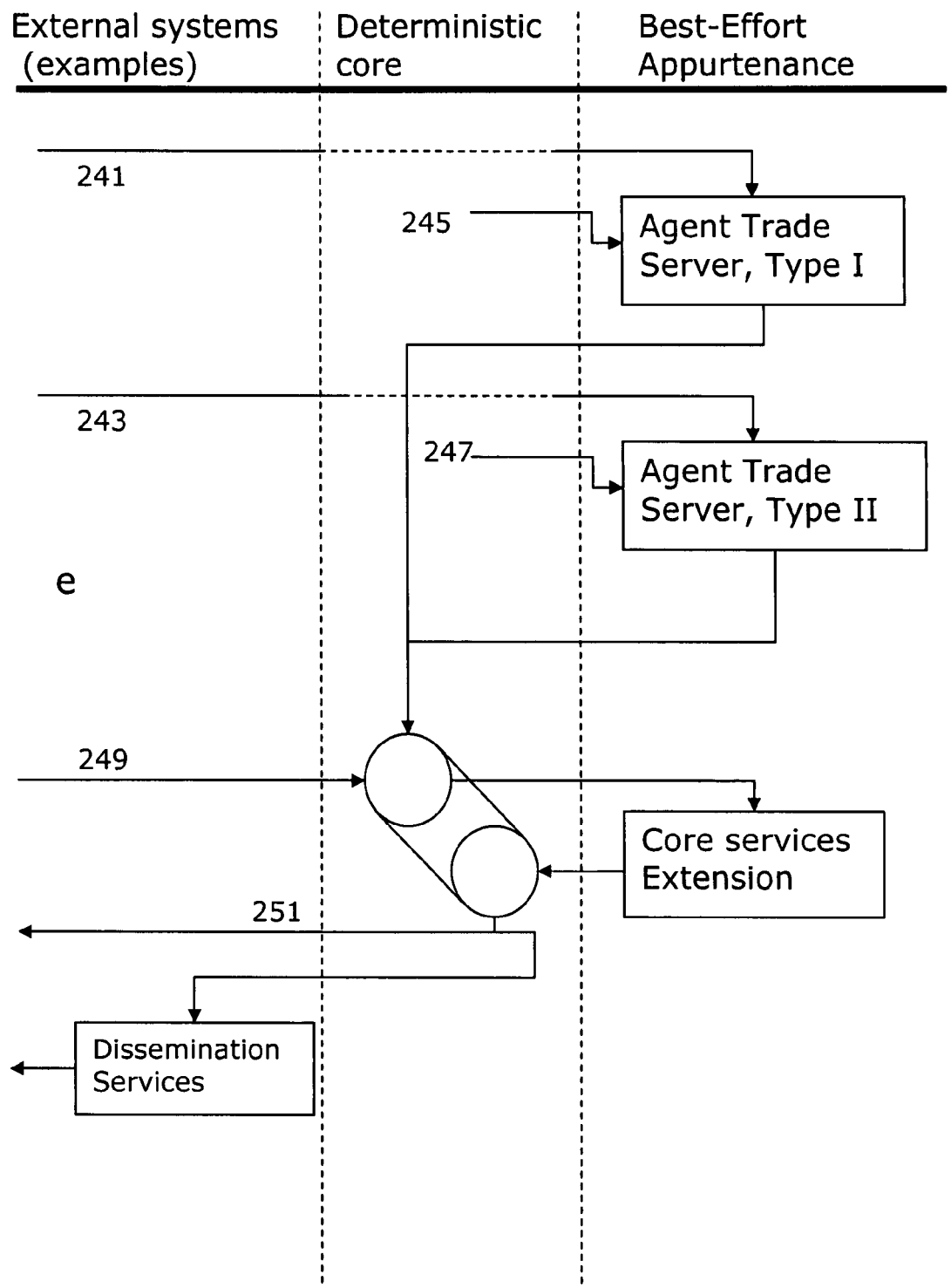

The flowcharts in FIG. 2a-2e illustrate different steps carried out when a user transmits an order to the exchange system in FIG. 1. FIG. 2a shows the general information flows in a conventional automated, computerized, exchange system when two participants explain their willingness to enter into trade via (at least) two separate order input messages, 201 and 203 respectively, submitted to the matching subsystem of the deterministic core unit 1. In an in-use system there may be several buffers, logging facilities and checkpoints located on the path from the gateway 2 to the matching sub-system, to make the core of the matching system robust and deterministic, but that is not the object of present invention and will therefore not be discussed further herein. If there is a match between the orders 201 and 203, the matching unit will generate a broadcast message 205 informing the participants involved in the trade, and, depending on market transparency settings, also generate a message 207 used for informing other interested parties (to limited or full extent) via a dissemination service unit that broadcasts a message 209.

In FIG. 2b an example of an information flow involving the unit 3, and in particular the sub-unit 3a, is shown. In the example depicted in FIG. 2b several complex combinatorial orders are submitted from input terminals via input orders 211. Further, it is assumed that the order-matching unit cannot immediately and deterministically allocate deals from these orders 211. A typical scenario is that the orderbook is in the mode of a combinatorial auction procedure. Hence, a number of orders are temporarily blocked under certain conditions. The orders are then swiftly given to a core services extension in the best-effort sub-system 3, i.e., the sub-unit 3a in this example, which proposes an allocation within a short and discrete time frame, hands the orders back to the matcher with the allocation proposal message 213. If the matcher can accept the proposed allocation, it executes accordingly and disseminates in the results of the trade in a conventional way as previously described with a message 215.

FIG. 2c shows the case when a participant, i.e. a user connected to the system via an input terminal, has configured a trading agent in an Agent Trade Server (ATS) via a message 217. The ATS corresponds to the sub-unit 3b as described above. It is preferred that the means for communication 217 is not part of the core, since that could compromise the paradigm stance. The agent of the sub-unit 3b is continuously fed the same market data from the deterministic core unit 1 exactly as the participant would have been, and can also be, fed through external systems via messages 219. The agent makes a decision based on its configuration parameters and the market data it has received and may put an order 221 to the deterministic core through proper interfaces such as a gateway or connector facility, thus routed into the same stream as all other arriving orders 223. The matcher unit evaluates everything at hand and produces deals and market information messages 225, as described above in conjunction with FIGS. 2a and 2b.

In FIG. 2d illustrates another part of the unit 3, the agent of the sub-unit 3c. The behavior of the agent, as seen from the perspective of the core, is the same as that of the sub-unit 3b described in conjunction with FIG. 2c. The difference being that the participant can upload executable code (or scripts) to a predefined agent trade server computer in the best-effort unit 3 via orders 227. It is preferred that the means for communication of the orders 227 is not part of the core, since that could compromise the paradigm stance. While the inner workings of the sub-unit 3c are different to the sub-unit 3b, they preferably have identical interfaces to the core unit 1. The information messages 229, 231, 233 and 235 therefore correspond to the corresponding information flows depicted in FIG. 2c.

Finally, FIG. 2e is an overall view of the combined information flow in a system as depicted in FIG. 1. Thus, building upon the robustness of the deterministic exchange system platform, a complementary subsystem operating fully under the best-effort principle is formed, increasing the overall system performance with respect to bandwidth management, processing resource management, fault tolerance, and exception handling. The overall system formed in this manner will have a continued complete tractability in the current services. The hybrid system where the new, optional best-effort services are contained in a separate subsystem, which can be termed the best-effort appurtenance, will complement in a conventional deterministic exchange system.

A cardinal use case for the new subsystem is when the user uploads a latent order combined with a trigger configuration, combined into a so-called agent instruction, to the ATS. The ATS, operating under the best-effort principle, communicates with the exchange system platform using one of the already available protocols. The ATS computer will typically be placed physically close to the computer hosting the traditional central software of the exchange system (the core), and between the ATS and the core will be a high-speed, local connection.

The ATS, upon receiving the agent instruction, will create a new thread to handle this new request, or revise a previously spawned thread or process. A precondition for the automatic activation of a latent order in the ATS is a Boolean operation on a set of scenario triggers. Inspirational generic scenarios can be proposed by the marketplace operator, and then adjusted by each trader or investor. The scenarios could be saved in personalized galleries, and optionally calibrated for each individual order. The Agent in the ATS will continuously evaluate the triggers in its instruction against real-time market information received from the deterministic core unit.

The drawback for the trader with communicating trade intention early, can be more than offset by the inherent premium in the reliable, cheap, high-speed connection between the core and the ATS. The proximity and direct connection is effectively feeding the ATS with market data much faster than anyone else, thus putting the agents in the ATS at an advantage in certain cases. This maybe inciting enough to stimulate an early submission of orders via the ATS.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A computerized automated trading system for trading of financial instruments between traders connected to the system via remote terminals and a data network, comprising:

a deterministic central matching unit for providing deterministic matching orders entered into the system by the traders in which outputs from the deterministic central matching unit depend only on input data received by the deterministic central matching unit, and a non-deterministic supplemental trading server coupled to the deterministic matching unit for providing supportive functions in accordance with a best-effort principle in which outputs generated by the non-deterministic supplemental trading server can not be guaranteed to be deterministic.

2. A system according to claim 1, wherein the supplemental trading server is physically co-located with the server hosting the central matching unit.

3. A system according to claim 1, wherein the supplemental trading server is configured to calculate solutions to combination orders.

4. A system according to claim 1, wherein the supplemental trading server is couplable to the remote terminals and comprises a user-configurable agent.

5. A system according to claim 1, wherein the supplemental trading server comprises a user-programmable agent.

6. A method for performing computerized automated trading of financial instruments between traders, where the traders are coupled to the system via remote terminals and a data network, comprising:

deterministically matching orders entered into the system by the traders in which outputs resulting from the deterministic order matching depend only on received input data, and providing a supplemental, non-deterministic automated trading service on a best effort basis in which outputs generated by the supplemental, non-deterministic automated trading service can not be guaranteed to be deterministic.

7. The method in claim 6, wherein the deterministic matching is performed by a deterministic central matching unit and the supplemental, non-deterministic automated trading service is performed by a supplemental, non-deterministic trading server, the method further comprising:

providing data generated as a result of the supplemental, non-deterministic automated trading service from the supplemental, non-deterministic automated trading server to the deterministic central matching unit, and the deterministic central matching unit using the provided data in order matching.

8. The method in claim 6, wherein the supplemental, non-deterministic automated trading service includes calculating solutions to combination orders.

9. A non-deterministic trading server for use in a computerized automated trading system for trading of financial instruments between traders connected to the system via remote terminals and a data network, comprising:

a non-deterministic trading server couplable to a deterministic matching unit for providing supportive functions for the deterministic matching unit in accordance with a best-effort principle in which outputs generated by the non-deterministic supplemental trading server can not be guaranteed to be deterministic, where deterministic means that determined outputs depend only on received inputs, one or more input ports for providing input data to the non-deterministic trading server, and one or more output ports for providing output data from the non-deterministic trading server.

10. A non-deterministic trading server according to claim 9, wherein the supplemental trading server is physically co-located with the server hosting the deterministic matching unit.

11. A non-deterministic trading server according to claim 9, wherein the supplemental trading server is configured to calculate solutions to combination orders.

12. A non-deterministic trading server according to claim 9, wherein the supplemental trading server is couplable to the remote terminals via the one or more input ports and comprises a user-configurable agent.

13. A system according to claim 9, wherein the supplemental trading server is couplable to the remote terminals via the one or more input ports and comprises a user-programmable agent.

\* \* \* \* \*